US007870051B1

(12) United States Patent
En et al.

(10) Patent No.: US 7,870,051 B1
(45) Date of Patent: Jan. 11, 2011

(54) SELECTING INVESTMENTS FOR A PORTFOLIO

(75) Inventors: Xuehai En, Bedford, MA (US); William Van Harlow, Concord, MA (US); Hsiaoping R. Hua, Brookline, MA (US); Scott Kuldell, Newton, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 09/346,195

(22) Filed: Jul. 1, 1999

(51) Int. Cl.
*G06Q 40/00* (2006.01)
(52) U.S. Cl. .................................................. 705/36 R
(58) Field of Classification Search .............. 705/35–45
See application file for complete search history.

(56) References Cited

U.S. PATENT DOCUMENTS 7,668,773 B1 * 2/2010 Pruitt ....................... 705/36 T

FOREIGN PATENT DOCUMENTS

| EP | 0 401 203 | 5/1990 |
| EP | 0 434 877 | 7/1991 |
| EP | 0 573 991 | 12/1993 |
| EP | 0 686 926 | 12/1995 |
| JP | 05-120297 | 5/1993 |
| JP | 2002-502514 | 1/2002 |

OTHER PUBLICATIONS

Elton et al., The Persistence of Risk-Adjusted Mutual Fund Performance, Journal of Business 69:133-157, 1996.

Jerry Morgan, "Mutual Funds/When is advice not advice? On the Net/Most online financial-advise sites are mainly portfolio monitors and retirement calculators". Newsday, Inc., Money & Careers, p. F05, Load date Jul. 9, 2000, p. 1-3.

Financial Engines, "Financial Engines Launches Online Advice for All Tax-Deferred Retirement Accounts". Accessible at https://www.financial.../FeContent?&s=1867dfb62c5db0&bcfg=yy&pact=abtprscur&act=abtprsr2, accessed on Dec. 28, 2000, pp. 1-2.

Investment Technologies, "The Retirement Advisor". Accessible at http://www.investmenttechnologies.com/retirement_advisor.htm, accessed on Sep. 15, 2000, pp. 1-2.

Investment Technologies, "The Risk Advisor". Accessible at http://www.investmenttechnologies.com/risk_advisor.htm, accessed on Sep. 15, 2000, pp. 1-2.

Investment Technologies, "The Professional Advisor". Accessible at http://www.investmenttechnologies.com/professional_advisor.htm, accessed on Sep. 20, 2000, pp. 1-2.

Investment Technologies, "Common Questions About the Risk Advisor". Accessible at http://www.investmenttechnologies.com/risk_advisor_wsj_code_lib/risk_advisor_faq.htm, accessed on Sep. 20, 2000, total of 28 pages.

* cited by examiner

*Primary Examiner*—Richard C Weisberger
(74) *Attorney, Agent, or Firm*—Fish & Richardson P.C.

(57) ABSTRACT

A method of constructing a portfolio includes receiving target allocations for different types of assets, receiving a list of investments available for inclusion in the portfolio, and selecting investments from the list of investments based on a measure of the risk-adjusted excess return of selected investments and the target allocations.

41 Claims, 9 Drawing Sheets

Target Asset Mixes

| Target Asset Mix | Conservative | Balanced | Growth | Aggressive Growth |
|---|---|---|---|---|
| Stocks-Domestic | 20% | 45% | 60% | 70% |
| Stocks-Foreign | 0% | 5% | 10% | 15% |
| Bonds | 50% | 40% | 25% | 15% |
| Short-term | 30% | 10% | 5% | 0% |

FIG. 2

Your "investor profile" is a picture of a hypothetical investor who has similar characteristics to yours. Your response to this questionnaire will be evaluated to determine your risk tolerance, personal financial situation and time horizon for investing for retirement. Your target asset mix will be based on the answers to these profile questions.

105a — 1.) Enter Total Investable Assets:

Please list amount of money you have saved for retirement and other, non-retirement goals. This information will help us assess your household's entire financial situation. Include your transfer or rollover amount under Retirement in the Short-term category because in this process we assume that your transfer or rollover is a cash position.

|  | Retirement | Non-retirement |
|---|---|---|
| Stocks | $ | $ |
| Bonds | $ | $ |
| Short-term | $ | $ |
| Other | $ | $ |
| Total | $ | $ |

Retirement: Assets designated for retirement including your rollover or TOA amount.
Non-retirement: Assets designated for other goals.

105b — 2. What is the chance your household will need to spend more than __% of your savings for another purpose in the next 5 years? (Your answer helps us determine whether a significant amount of savings will be needed soon.)

__75% __50% __25% __10% or less

105c — 3. How much household income are you saving on an annual basis toward your goal? (What is your annual contribution to this goal?)

105d — 4. How many people do you support other than yourself? (Dependents may include children, elderly parents, and your spouse.)

105e — 5. How much is your household income before taxes? (Include salary, bonus, commissions and other sources of income such as a rental property, alimony and child support.)

FIG 3A

| __$21,000 | __$21,000 to $30,000 | __$31,000 to $70,000 | __$71,000 to $100,000 | __$101,000 to $150,000 | __$151,000 to $250,000 | __$251,000 or more |
|---|---|---|---|---|---|---|
| | | | | | | |

105f ~ 2. Please indicate how your household income might change over the next five years. (If your household income fluctuates widely from year to year, answer in terms of average increased in your household income over time.)

__Far outpace
   __Mildly outpace
   __Keep pace
   __Decrease

105g ~ 3. How much of your monthly take-home income is used to pay for essential expenses? (Include rent or mortgages, food, utilities, recreation, etc.).

__Under 25%
   __25 to 50%
   __50 to 75%
   __Over 75%

105h ~4. What is your estimated combined federal, state and local tax bracket? (Keep in mind that once you leave the workforce: your tax bracket is likely to be lower, although tax rates could change by then.)

__15%
   __28%
   __36%
   __39.6%

105i ~ 5. How would you describe your household's overall financial situation? (Consider your employment outlook, benefits, expenses and savings.)

__Very secure and stable
   __Secure and stable
   __Somewhat secure and stable
   __Neither secure nor stable 105j ~ 6. Which of the following best describes your level of investment knowledge and experience with stocks or stock mutual funds? (Your answer will help us to determine the depth of your investment experience.)

__Novice investor
   __A few years experience, basic understanding

FIG. 3B

__A few years experience, solid understanding
__Several years experience, basic understanding
__Several years experience, solid understanding
__Experienced, owned options and commodities 105k ~ 7. Keeping in mind your tolerance for short-term fluctuations, as well as investment goals, where would you be most comfortable placing yourself on this scale?

Low end: Avoiding short-term losses is more important than higher total returns.

__1  __2  __3  __4  __5  __6  __7  __8  __9  __10

High end: Higher total return is more important than avoiding short-term losses.

105l ~ 8. Assuming that you invested $100,000 and the market dropped in the first years, causing the value to fall, where would you sell? (Your answer will help us understand your comfort with investment risk.)

__When the value drops 5% to $95,000.
__When the value drops 10% to $90,000.
__When the value drops 15% to $85,000.
__When the value drops 20% to $80,000.
__When the value drops more than 20%.
__I would not sell.

If you are within two years of your retirement goal, please answer questions 13 and 14. Otherwise, you do not need to answer these questions.

105m ~ 13.) Estimate the annual income you will need from your retirement investments.

105n ~ 14.) Choose the statement that best describes your plan to use your retirement savings and investments. (The items in the drop down include:

a) intend to take MRD by IRS
b) use other sources first
c) withdraw regularly
d) use most of money early
e) withdraw more than half

FIG. 3C

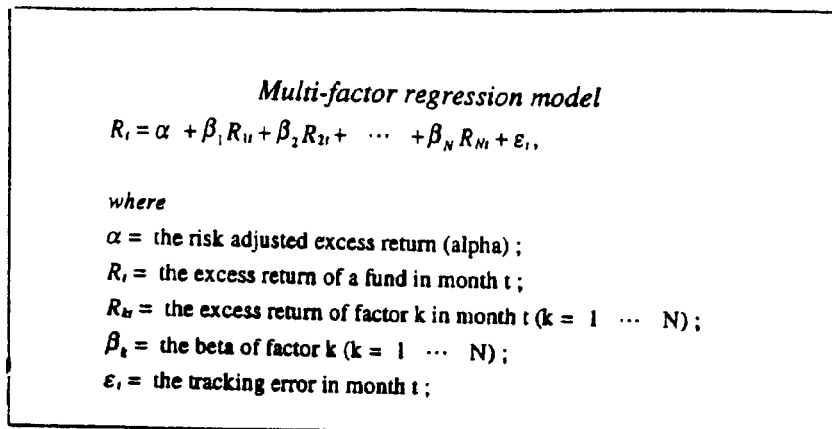

*Multi-factor regression model*
$$R_t = \alpha + \beta_1 R_{1t} + \beta_2 R_{2t} + \cdots + \beta_N R_{Nt} + \varepsilon_t,$$

where $\alpha$ = the risk adjusted excess return (alpha);
$R_t$ = the excess return of a fund in month $t$;
$R_{kt}$ = the excess return of factor $k$ in month $t$ ($k = 1 \cdots N$);
$\beta_k$ = the beta of factor $k$ ($k = 1 \cdots N$);
$\varepsilon_t$ = the tracking error in month $t$;

— 106

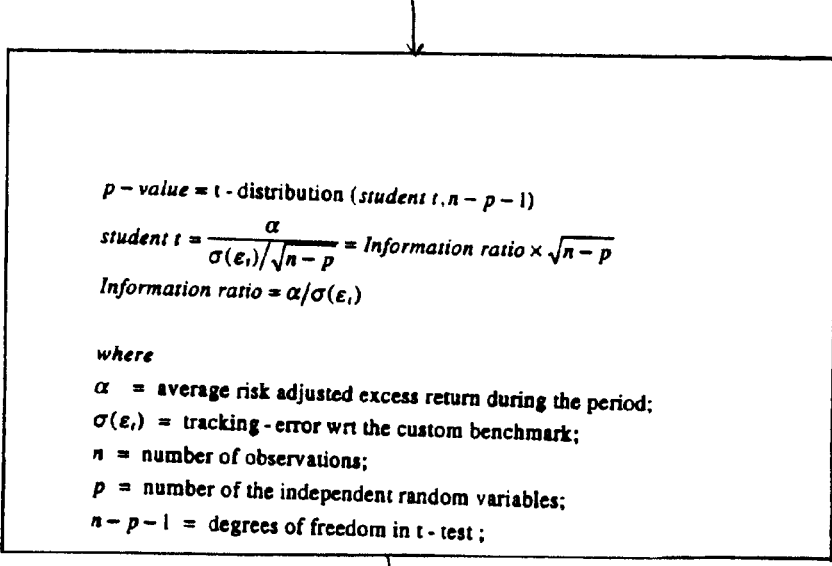

$p - value = t\text{-distribution}\,(student\ t, n - p - 1)$ $student\ t = \dfrac{\alpha}{\sigma(\varepsilon_t)/\sqrt{n-p}} = \text{Information ratio} \times \sqrt{n-p}$ $Information\ ratio = \alpha/\sigma(\varepsilon_t)$ where $\alpha$ = average risk adjusted excess return during the period;
$\sigma(\varepsilon_t)$ = tracking-error wrt the custom benchmark;
$n$ = number of observations;
$p$ = number of the independent random variables;
$n - p - 1$ = degrees of freedom in t-test;

— 110a

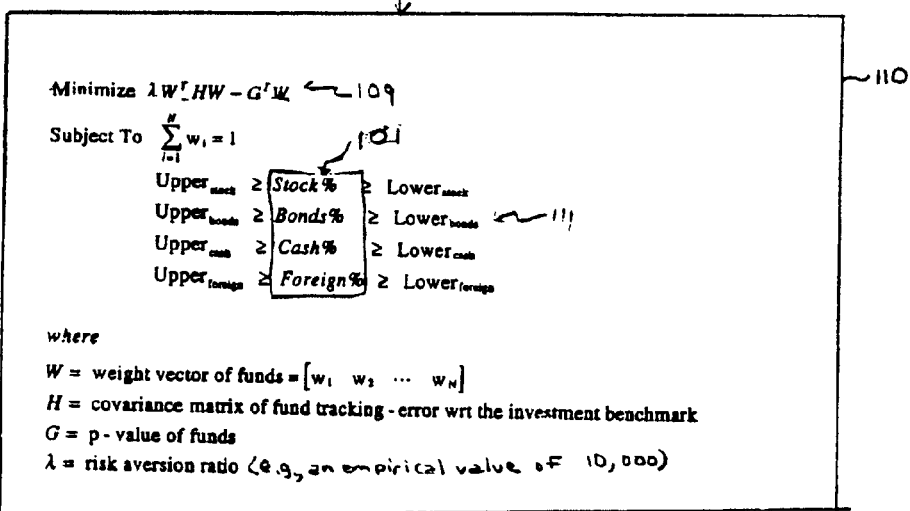

Minimize $\lambda W^T H W - G^T W$ ← 109

Subject To $\sum_{i=1}^{N} w_i = 1$    ,101

$Upper_{stock} \geq \boxed{Stock\%} \geq Lower_{stock}$
$Upper_{bonds} \geq \boxed{Bonds\%} \geq Lower_{bonds}$ — 111
$Upper_{cash} \geq \boxed{Cash\%} \geq Lower_{cash}$
$Upper_{foreign} \geq \boxed{Foreign\%} \geq Lower_{foreign}$ where $W$ = weight vector of funds = $[w_1\ w_2\ \cdots\ w_N]$
$H$ = covariance matrix of fund tracking-error wrt the investment benchmark
$G$ = p-value of funds
$\lambda$ = risk aversion ratio (e.g., an empirical value of 10,000)

SELECTING INVESTMENTS FOR A PORTFOLIO

BACKGROUND OF THE INVENTION

This invention relates to selecting investments for a portfolio.

Company sponsored retirement plans often offer employees a number of different investment options for inclusion in a portfolio. These investment options can include domestic and foreign stock mutual funds, bonds, and short-term investments such as money-market funds. Services such as Morningstar® regularly update and publish data describing the performance and other characteristics of investments to aid investors.

SUMMARY OF THE INVENTION

In general in one aspect, the invention features a method of constructing a portfolio. The method includes receiving target allocations for different types of assets, receiving a list of investments available for inclusion in the portfolio, and selecting investments from the list of investments based on a measure of the risk-adjusted excess return of selected investments and the received target allocations.

Embodiments may include one or more of the following features. The types of assets can include at least one of the following: domestic stock funds, foreign stock funds, bonds, and short-term assets. The target allocations may correspond to different target allocation categories. Such categories may include a conservative category, a balanced category, a growth category, and an aggressive growth category. The target allocation may be determined, for example, by scoring investor responses to questions.

The measure of risk-adjusted excess return can be an alpha measurement determined in accordance with:

$$R_t = \alpha + \beta_1 R_{1t} + \beta_2 R_{2t} + \ldots + \beta_N R_{Nt} + \epsilon_t,$$

where $\alpha$=the risk adjusted excess return (alpha);
$R_t$=the excess return of a fund in month t;
$R_{kt}$=the excess return of factor k in month t (K=1 ... N);
$\beta_k$=the $\beta$ of factor k (k=1 ... N);
$\epsilon_t$=the tracking error in month t;

The method may further include determining weightings for the selected investments. Such determining weightings can include using $$\text{Minimize } \lambda W^T H W - G^T W$$

$$\text{Subject} \sum_{i=1}^{N} W_i = 1$$

Upper$_{stock}$ ≥ Stock % ≥ Lower$_{stock}$
Upper$_{bonds}$ ≥ Bonds % ≥ Lower$_{bonds}$
Upper$_{cash}$ ≥ Cash % ≥ Lower$_{cash}$
Upper$_{foreign}$ ≥ Foreign % ≥ Lower$_{foreign}$ where W=weight matrix of fund tracking-error wrt the investment ben G=p-value of funds $\lambda$=risk aversion ratio and $$p\text{-value} = t\text{-distribution (studentt, } n - p - 1)$$

$$\text{student } t = \frac{\alpha}{\sigma(\epsilon_t)/\sqrt{n-p}} = \text{information ratio } x\sqrt{n} - p$$

$$\text{Information ratio} = \alpha/\sigma(\epsilon_t)$$

where $\alpha$=average risk adjusted excess return during the period;

$\sigma(\epsilon_t)$=tracking-error wrt the custom benchmark;

n=number of observations;

p=number of the independent random variables;

n−p−1=degrees of freedom in t-test;

The selecting can be based on investment net assets, investment life-span, investment turnover ratio, investment expense ratio, investment minimum deposit requirement, and/or investment cash position. The selecting can also be based on a categorization of an investment, such an investment objective or style categorization. Selecting can also be based on an $R^2$ descriptive statistic indicating the consistency of an investment's risk-adjusted excess return measure.

The method may include evaluating the constructed portfolio. Such evaluating can include determining whether sector allocation of the constructed portfolio corresponds to a sector allocation of a market benchmark, determining whether the constructed portfolio is too heavily weighted to one of the selected investments, and/or determining whether the constructed portfolio is insufficiently weighted to one of the selected investments.

The method may also include constructing a different portfolio, for example, after modifying the target asset allocations. The method may also include providing a report describing the constructed portfolio.

The method may also include receiving a target allocation to company stock. Such a method may include adjusting the received target allocations for different types of assets based on the received portfolio allocation to company stock. The adjusting may be such that the target allocations and the allocation to company stock have an associated risk level substantially the same as a risk level associated with a portfolio not having an allocation to company stock.

In general, in another aspect, the invention features a method of constructing a portfolio that includes receiving target allocations for different types of assets such as domestic stock funds, foreign stock funds, bonds, and short-term assets, receiving a list of investments available for inclusion in the portfolio, screening the list of investments, selecting and weighting investments from the screened list of investments based on a measure of the risk-adjusted excess return of selected investments and the received target allocations.

In general, in another aspect, the invention features a computer program product, disposed on a computer readable medium, for constructing a portfolio. The computer program product includes instructions for causing a processor to receive target allocations for different types of assets, receive a list of investments available for inclusion in the portfolio, and select investments from the list of investments based on a measure of the risk-adjusted excess return of selected investments and the received target allocations.

Advantages of the invention may include one or more of the following. The invention can be used to construct a portfolio from the unique collection of investment options offered by each different company retirement plan. The constructed portfolio includes investments that demonstrate consistent returns and a history of successful securities selection. The process tailors the risk associated with the portfolio using a target asset allocation based on the investor's risk tolerance and financial situation. The target asset allocations empirically maximize a rate of return for given levels of risk.

Other advantages of the invention will become apparent in view of the following description, including the figures, and the claims.

BRIEF DESCRIPTION OF THE DRAWINGS

FIG. 2 is a table of target asset allocations.

FIGS. 3A-3C are questions included in an investor profile questionnaire.

FIG. 4 is a flowchart of a process for constructing a portfolio.

DESCRIPTION OF THE PREFERRED EMBODIMENTS

Figure 1:
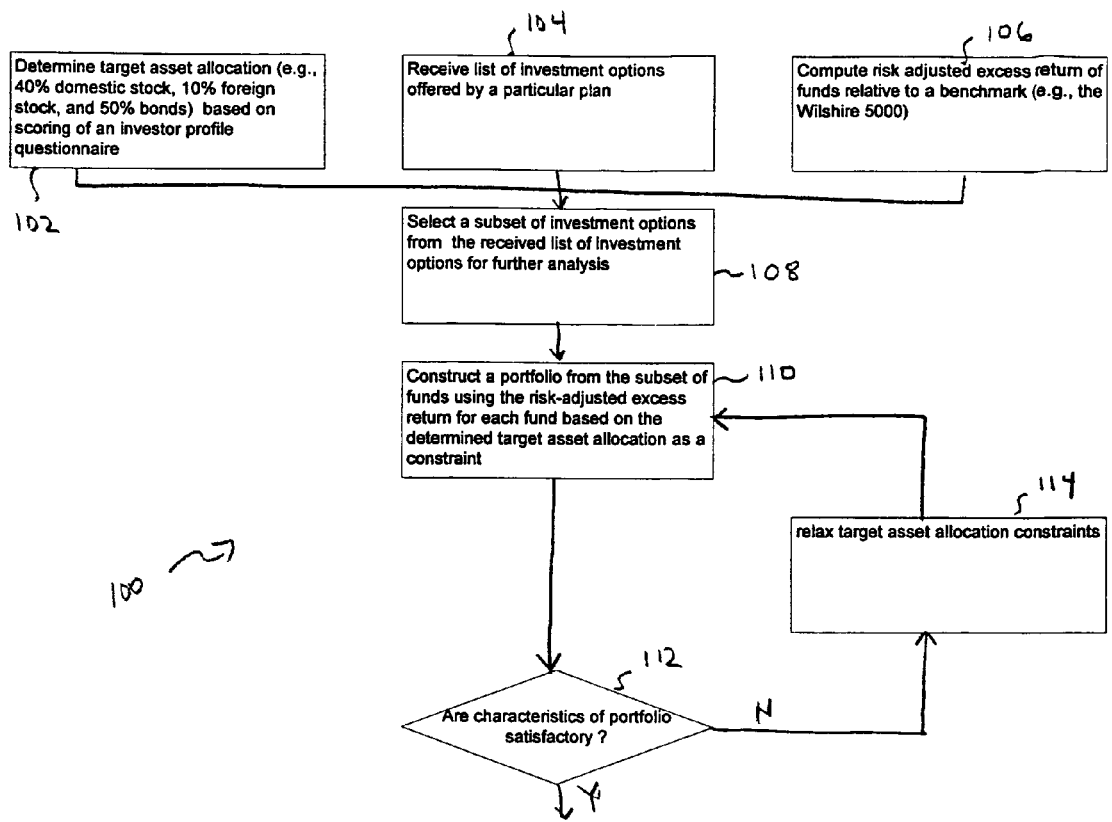
FIG. 1 is a flowchart of a process for constructing a portfolio.

Referring to FIG. 1, a system 100 constructs a portfolio from a set of investments options 104 such as mutual funds offered by a company retirement plan. The system 100 constructs 110 a portfolio from the investments based on their history 106 of exceeding returns expected for a level of risk associated with the investments. The system 100 tailors the portfolio to reflect a target asset allocation 102 that may be based on an investor's risk tolerance and financial situation. As shown in FIG. 1, the system 100 may screen 108 funds prior to constructing 110 the portfolio. Additionally, the system 100 can evaluate the constructed portfolio 112 to determine whether it can be improved, for example, by relaxing 114 the target asset allocations.

Referring to FIG. 2, the system can determine target asset allocations by categorizing an investor as belonging to a particular target asset allocation class 101a-101d. In one embodiment, the system uses conservative 101a, balanced 101b, growth 101c, and aggressive growth 101d classes that correspond to asset mixes having increasing levels of risk and potential returns.

Each class 101a-101d includes a pre-specified level of investment in different types of assets such as domestic stock mutual funds 103a, foreign stock mutual funds 103b, bonds 103c, and short-term investments 103d (e.g., Treasury Bills and money-market funds). The target class investment levels 103a-103d represent the best historical rate of return for a given level of risk.

The asset mix classes shown in FIG. 2 are not necessary to use the invention. For example, a user constructing a profile can hand enter a personally preferred level of investment in the different types of assets. Additionally, other embodiments include different investor class categories and different asset allocation targets.

Referring to FIGS. 3A-3C, the system may categorize an investor by scoring responses to an investor profile questionnaire. The questionnaire assesses an investor's investment time horizon, risk tolerance, and financial situation. Each question in the questionnaire is given a score and a weight. The score for each assessment area (e.g., time horizon, risk tolerance, and financial situation) is the weighted average score of the questions touching that area. The higher the score, the more aggressive the potential target asset mix. The final score is based on the lowest (most conservative) of the scores of the three assessment areas. Therefore, if an investor has a short time horizon and, thus, a low time horizon score, the final score may lead to a conservative target asset mix regardless of a high risk tolerance score.

Scoring answers to time horizon questions 105b, 105m, 105n associates investors with more than seven years until retirement with the Aggressive Growth target asset mix. Investors with four to seven years to retirement are normally assigned a time horizon score associated with the Growth target asset mix. For investors with less than four years to retirement, the focus of the time horizon score shifts toward the amount of income the investor plans to withdraw annually from the portfolio and how those withdrawals are likely to be taken. These questions 105m, 105n are asked only for investors with less than four years to retirement. In general, investors with annual income requirements of less than 3.5% per year are assigned a score associated with the Growth target asset mix, while those with annual income requirements of more than 5.5% are assigned a score associated with the Conservative target asset mix.

The risk tolerance questions 105i-105l measure an investor's experience, a self-reported risk tolerance on a 1-10 scale, and the investor's threshold for loss. In practice, changes to responses to questions 105k and 105l tend to be the most likely to shift an investor's overall score from one target asset mix to another.

The financial situation questions 105a, 105c-105h gauge the financial flexibility of the investor. Items scored include the number of dependents, an overall financial self-assessment, household income, household expenses and expected household income growth. Additionally, the size and aggressiveness of assets outside the plan are factored into the score. In practice, changes to the responses to any one of these questions has little effect on the overall score.

In creating the score for each module, each question is assigned a weight and each response is assigned a score. The weight of each question, though, is dependent on the response: extreme responses are weighted more heavily than middle-of-the-road responses. For example, one of the Risk Tolerance questions asks an investor to place themselves on a scale from "1"-"10" where a "1" indicates the investor seeks to avoid and a "10" indicates an investor seeks higher returns. The scoring procedure weighs responses of "1" or "10" more heavily than responses of "4" or "5".

Referring to FIG. 4, the system can compute or receive 106 an estimation of each investment's normalized risk-adjusted excess return, $\alpha$, and tracking-errors, $\epsilon$, associated with the investment. The normalized risk-adjusted excess return can represent an investment fund manager's ability to potentially select securities that outperform the market in view of the fund's level of risk. The tracking-error represents the standard deviation of the difference between the return of a fund and a benchmark return. A large tracking error represents a volatile (e.g., risky) fund.

As shown, the system uses a multi-factor regression model 106 to determine the risk-adjusted excess return, or, for a fund over a period of time (e.g., three years). The model uses monthly return data for t preceding months (e.g., 36 months) to determine the monthly return of a fund ($R_t$) in excess of a market benchmark. Each type of asset uses a different market benchmark. For example, domestic stocks, foreign-stocks, bonds, and short-term assets can use the following respective market benchmarks: the Wilshire 5000 Equity Index, the Morgan Stanley Capital International, Europe, Australia, Far East Index, the Lehman Brothers Aggregate Bond Index, and the 30-month U.S. Treasury Bill Index.

To determine the risk-adjusted return and tracking error, the model 106 measures the sensitivity, $\beta$, of the excess return ($R_t$) to different factors $R_{kt}$. A higher $\beta$ value indicates a greater insensitivity of the excess return to the change in a factor. The factors can differ for different types of assets. In one embodiment, the factors for each asset type include factors in the following tables.

| Domestic Stock Factors | |
| --- | --- |
| $R_{1t}$ | Lehman Aggregate |
| $R_{2t}$ | Russell 3000 |
| $R_{3t}$ | Russell 1000-Russell 2000 |
| $R_{4t}$ | Russell 3000 Growth-Russell 3000 Value |
| Foreign Stock Factors | |
| $R_{1t}$ | MSCI (Morgan Stanley Capital International) North America |
| $R_{2t}$ | MSCI Europe |
| $R_{3t}$ | MSCI Far East |
| $R_{4t}$ | IFC (International Finance Corporation) Latin America |
| $R_{5t}$ | Trade Weighted U.S. Dollar |
| Fixed Income (Bond, Short-Term) Factor | |
| $R_{1t}$ | Lehman Aggregate |
| $R_{2t}$ | Lehman BAA - Lehman Treasury |
| $R_{3t}$ | Salomon Treasury 10 Plus - Salomon Treasury |
| $R_{4t}$ | Salomon 1 Year Treasury - Salomon Treasury |
| $R_{5t}$ | Lehman MBS - Lehman Aggregate |

A SAS "reg" procedure can determine the normalized risk-adjusted excess return, the tracking-error in each month, and an $R^2$ descriptive statistic for the fund. The $R^2$ statistic indicates how well the determined $\alpha$, $\beta$-s, and $\epsilon$ fit the return and factor data fed into the procedure. A low $R^2$ indicates the variables determined by SAS have a relatively poor fit with the data and can be interpreted as representing an inconsistently performing fund.

In some embodiments, the variable values for a particular fund may be retrieved from a database rather than computing these values anew each time a fund is considered for inclusion in a portfolio.

The system next determines a p-value 110a that indicates a fund manager's historical performance relative to an asset type's market benchmark. The p-value determination 110a uses a single tail (student t) distribution that assigns high p-values to investments having high positive $\alpha$-s. This measure is used to represent the normalized risk-adjusted excess return.

Using the obtained p-values, the system uses a SAS NLP procedure to minimize an objective function 109 subject to a set of constraints 111. The procedure finds a set of weights (e.g., numbers between 0 and 1), $w_N$, for the different funds that maximize the p-values in the portfolio while minimizing the tracking-error associated with each fund. The target asset allocations 101 form the constraints 111 for the NLP function. For example, weights for an investor categorized in the conservative asset allocation class would have a domestic stock constraint of 20% plus or minus a threshold (e.g., 1%).

Figure 5:
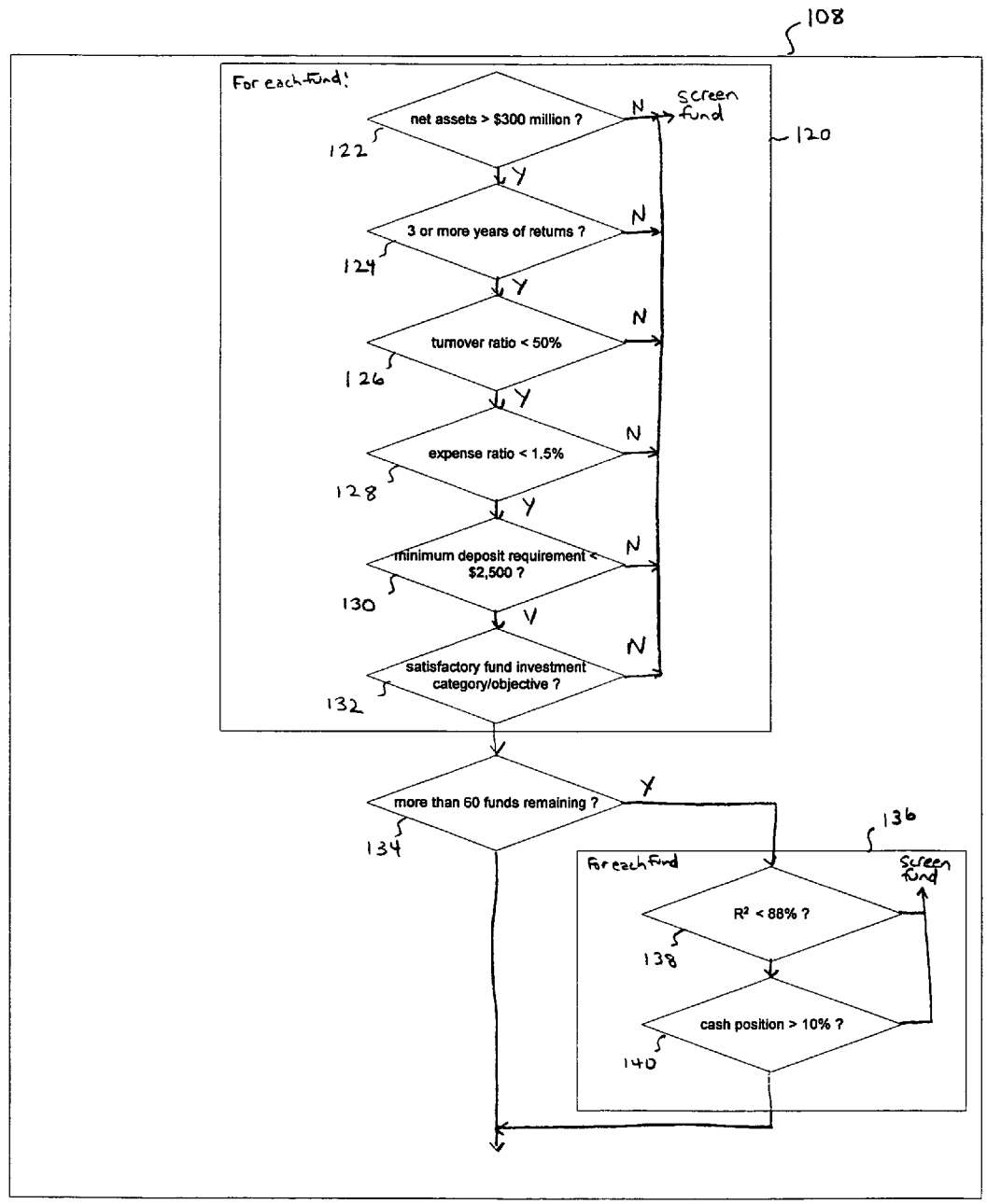
FIG. 5 is a flowchart of a process for screening a collection of funds for inclusion in the portfolio.

Referring to FIG. 5, the system may optionally screen 108 candidate investments prior to determining investment weightings (FIG. 4). This helps ensure the quality of the resulting portfolio. A preliminary series 120 of screening criteria typically eliminate all but fifty to sixty of the available funds from consideration. These criteria include eliminating investments from consideration that have net assets less then $300 million 122, funds having fewer than three years of returns 124, funds having a turnover ratio (i.e., the percentage of portfolio assets bought or sold in a period) over 50% 126, funds having an expense ratio (i.e., the percentage of average net assets spend on management) over 1.5% 128, and funds having a minimum deposit requirement over $2,500 130. The process 120 can also target specific investment options for elimination (not shown).

The preliminary screening process 120 also screens funds based on each fund's core investment objective as designated by Morningstar®. The investment object classifications include Equity Income, Growth and Income, Growth, Aggressive Growth, Small Company, Balanced, Government Bond, Corporate Bond, Foreign Stock, World Stock. These objectives can be further classified by the type of Morningstar® style-category to which the fund belongs. For domestic stock the style-categories include Large Value, Large Blend, Large Growth, Mid-Cap Value, Mid-Cap Blend, Mid-Cap Growth, Small Value, Small Blend, and Small Growth. Generally, the screening process 120 does not eliminate funds having a categorization listed above. However, for the Balanced objective, the fund must belong to the Morningstar® Domestic Hybrid category.

For fixed-income objectives, core investment categories that are not screened include Short Government, Intermediate Government, Long Government, Short-term Bond, Intermediate-term Bond, Long-term Bond, and High Yield Bond.

For the Foreign Stock and World Stock objectives, the fund must also belong to Foreign Stock and World Stock categories.

Separate classes of shares in a mutual fund are evaluated separately. For funds that do not have a sufficient performance history (e.g., <3 years) such as new institutional class of shares, a new index fund, or a clone of an established fund, the system may substitute the characteristics of a very similar fund such as the retail class of shares in the same fund, the index that a new fund seeks to track, or the first established fund which the clone seeks to emulate. This enables the fund to be evaluated for potential inclusion in the model portfolio.

If more than sixty funds remain 134 after preliminary screening 120, the screening process 108 can employ additional criteria 136. For example, the additional criteria can eliminate funds having $R^2$ values less than 88% 138 (e.g., inconsistently performing funds) or those funds having a cash position greater than 10% 140. If more than sixty funds still remain, the screening process can re-use criteria with progressively more restrictive thresholds. For example, the process 108 can eliminate funds having an $R^2$ value less than 90% or that have a cash position greater than 5%. Additionally, the screening process 108 can rank funds in each Morningstar° style category according to the fund $\alpha$. The screening process 108 can select the top N (e.g., 5) ranking funds from each style category and screen the rest to ensure a diversified portfolio.

Figure 6:
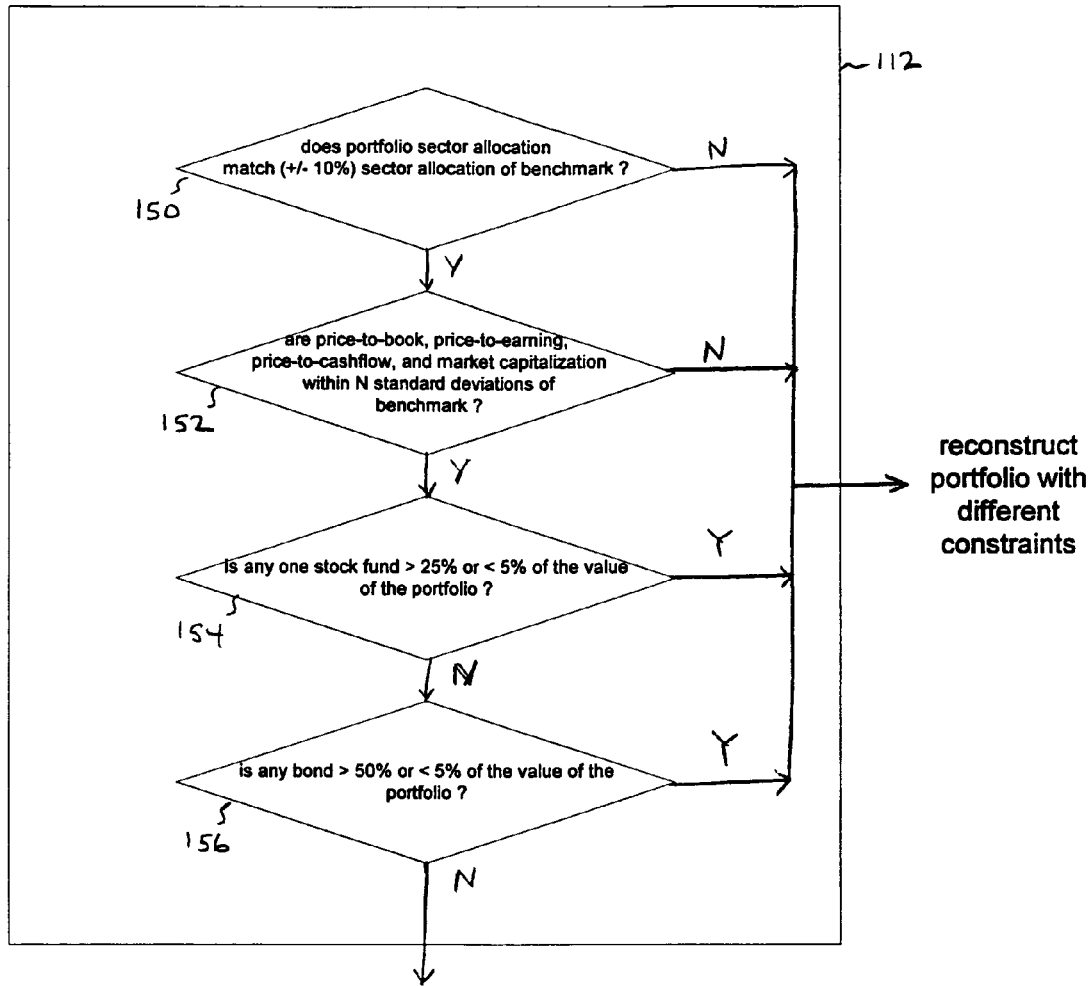
FIG. 6 is a flowchart of a process for evaluating a portfolio.

Referring to FIG. 6, in addition to screening funds prior to determining weightings, the system also evaluates 112 the portfolio constructed. For example, the system can compare the sector weights 150 (e.g., the allocations to durable, staple, energy, financial, health, retail, service, technology, utility, and cyclical sectors) of funds in the portfolio against the representation of these sectors in a market index such as the Wilshire 5000. If any sector is over or under represented in the portfolio by more than 10% relative to the market index, the system can reject the portfolio. The system may also reject a portfolio based on market data (e.g., price-to-earnings, priceto-book, price-to-cashflow, and market capitalization) of an investment option or a particular security included in the investment option. For example, the system may reject a portfolio that includes a particular fund having market data that exceeds a market benchmark by more than one standard deviation 152.

The system also can reject portfolios that lack a level of diversification. For example, the system can reject a portfolio having a domestic stock fund representing more than 25% of the total portfolio assets 154. The analysis can also reject portfolios that include a fund having less than 5% of total assets 154. These safeguards 154 ensure that each fund meaningfully contributes to the characteristics of the portfolio while maintaining diversity in the portfolio holdings. Since bonds are typically less volatile than stocks, diversification safeguards are relaxed somewhat. Thus, any bond can represent between 5% and 50% of the portfolio assets 156.

Finally, the system verifies that the asset allocation of the constructed portfolio closely matches the target asset allocation (see FIG. 2). A wide variety of other techniques could be used to reject constructed portfolios (e.g., Morningstar® ratings and/or Sharp® ratings).

If the system rejects a portfolio, a new portfolio can be constructed after relaxing the target asset allocation constraints. For example, instead of limiting the short-term asset allocation to 10%+/−1%, the system can relax the constraint to 10%+/−2%. The relaxation of the constraint can increase until reaching some maximum level such as 10%+/−5%. Thereafter, the system can attempt to relax the allocation constraints associated with other asset types. The system attempts to leave the domestic stock constraint alone as small changes in the range of possible values can greatly alter a portfolio. Thus, the system generally relaxes the target asset allocation constraints in the following order: cash, bonds, foreign stock, then domestic stock.

After determining the portfolio is satisfactory, the system can use the weightings of each fund as the basis for a model portfolio. For example, the system can multiply each weighting by the total investment amount to determine the actual investment amount in any fund or investment. The portfolio can be used to produce a variety of reports such as listing the investment options included in the portfolio and breaking the portfolio down by sector or asset type.

Figure 7:
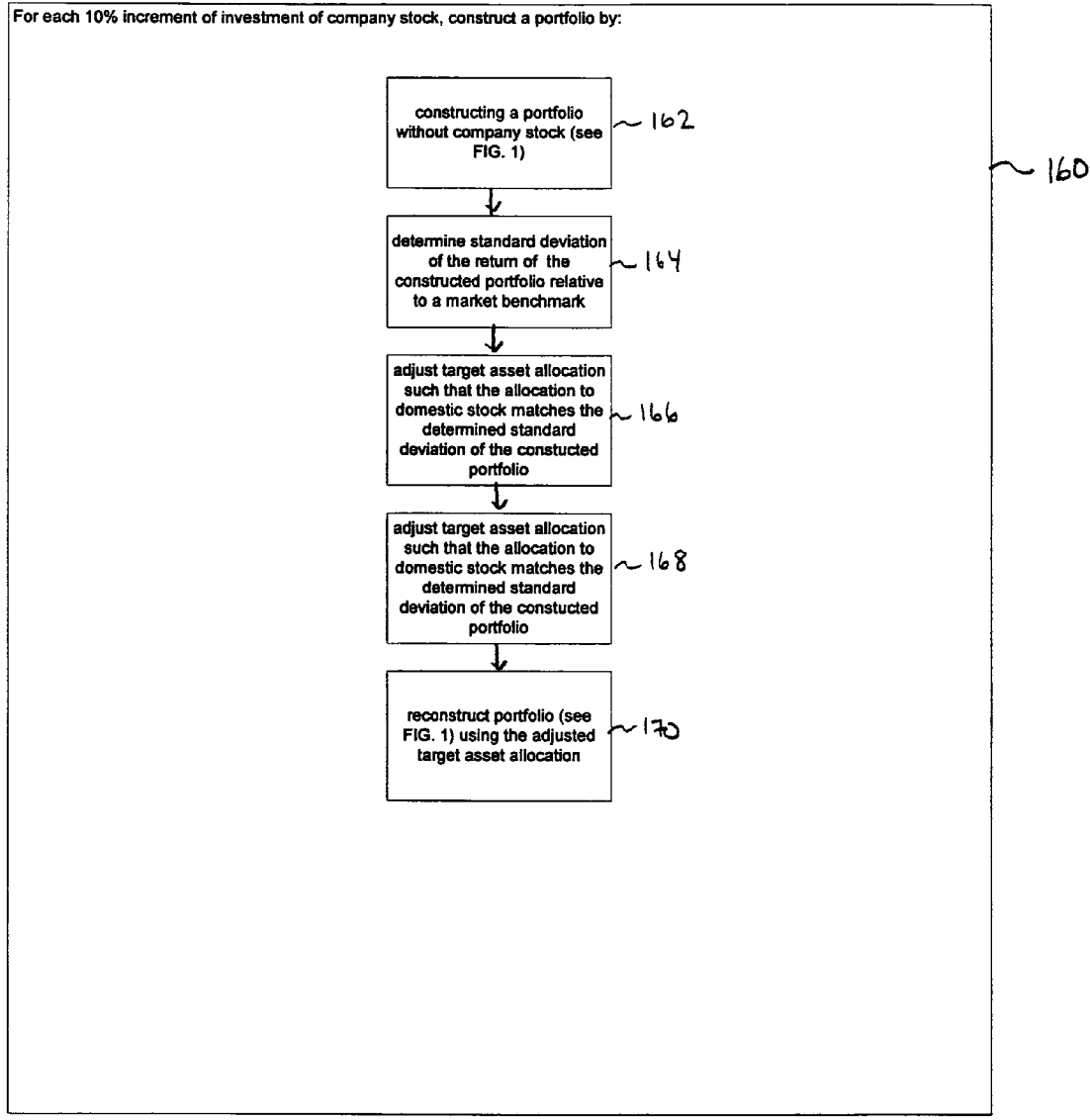
FIG. 7 is a flowchart of a process for constructing a portfolio including an employee's company stock.

Referring to FIG. 7, often a company will offer company stock for inclusion in a retirement plan. Some companies go so far as to require employees to participate in company stock purchase plans. A process 160 constructs different portfolios that include increasingly greater allocations devoted to company stock. For example, the process 160 may attempt to construct a portfolio having a 10% allocation to company stock, a portfolio having a 20% allocation, etc.

Company stock, however, represents an undiversified asset. That is, a large allocation of portfolio assets to a single security places a lot of eggs in the same basket. The process 160 attempts to construct portfolios such that portfolios including company stock have the same associated risk as a portfolio having no company stock. The process 160 first constructs a portfolio 162 with a 0% allocation to company stock based on the investor's target asset allocation (e.g., "Aggressive Growth"). The process 160 then determines 164 the standard deviation of the constructed portfolio's return relative to a market benchmark.

Company stock is typically a "domestic stock" asset. However, merely subtracting the allocation to company stock from the domestic stock target asset allocation may result in a portfolio having a greater associated risk than a portfolio not having company stock. Thus, reducing the allocation to domestic stock and increasing allocations to more conservative assets such as bonds and short-term assets can produce a portfolio having the same associated risk as the portfolio having no company stock.

The process 160 uses a SAS NLP procedure to adjust 166 the target asset allocations such that the return from the constructed portfolio has the same standard deviation relative to the market benchmark as the portfolio having the 0% allocation to company stock. For example, an investor in the "Aggressive Growth" class can have a target asset allocation of 70% domestic stock, 15% foreign stock, 15% bonds, and 0% short-term assets. A portfolio having a 10% allocation to company stock may cause the SAS procedure to adjust the target asset allocation from 70% to 45% and increase the asset allocation of bonds from 15% to 30% leaving a portfolio having a 10% allocation to company stock, a 45% allocation to domestic stock funds, a 15% allocation to foreign stocks, and a 30% allocation to bonds.

After using the adjusted target asset allocations to construct a portfolio (e.g., determine weightings for the available investment options) 170, the process 160 can present the different determined portfolios to an investor.

The techniques described here are not limited to any particular hardware or software configuration; they may find applicability in any computing or processing environment. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program is preferably implemented in a high level procedural or object oriented programming language to communicate with a computer system. however, the programs can be implemented in assembly or machine language, if desired. In any case, the language may be a compiled or interpreted language.

Each such computer program is preferable stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A computer-implemented method of constructing a portfolio of investment assets that are held for a customer in a customer account, the method comprising:

retrieving by one or more computer systems one or more target allocation ranges, each target allocation range including an upper limit value and a lower limit value for a type of investment asset to include in the portfolio;

receiving a list of investment assets available for inclusion in the portfolio;

selecting by one or more computer systems investment assets from the list of investment assets based on a measure of the risk-adjusted excess return of selected investment assets and the retrieved target allocation ranges;

adding the selected investment assets to the portfolio of investment assets;

determining by the one or more computer systems an asset allocation value for a first type of investment asset in the portfolio;

comparing by the one or more computer systems the asset allocation value for the first type of investment asset to an upper limit value and a lower limit value of the target allocation range for the first type of investment asset; and determining based on the comparison that the asset allocation value for the first type of investment asset is outside the target allocation range for the first type of investment asset.

2. The computer-implemented method of claim 1 wherein the types of investment assets comprise fixed income assets.

3. The computer-implemented method of claim 1 wherein the one or more target allocation ranges are associated with one or more categories of financial risk.

4. The method of claim 1 wherein determining by the one or more computer systems an asset allocation value for a first type of investment asset in the portfolio further comprises:

verifying that the asset allocation value for the first type of investment asset in the portfolio substantially matches a target allocation value included in the target allocation range for the first type of investment asset.

5. The computer-implemented method of claim 1 further comprising determining one or more target allocation ranges.

6. The computer-implemented method of claim 5 wherein the determining comprises categorizing an investor based on investor responses to questions.

7. The computer-implemented method of claim 1 wherein the measure of risk-adjusted excess return comprises an alpha measurement determined in accordance with:

$$R_t = \alpha + \beta_1 R_{1t} + \beta_2 R_{2t} + \ldots + \beta_N R_{Nt} + \epsilon_t, \text{ where}$$

$\alpha$=the risk adjusted excess return (alpha);
$R_t$=the excess return of a fund in month t;
$R_{kt}$=the excess return of factor k in month t (K=1 ... N);
$\beta_k$=the $\beta$ of factor k (k=1 ... N);
$\epsilon_t$=the tracking error in month t.

8. The computer-implemented method of claim 1 further comprising determining weightings of risk for the selected investment assets.

9. The computer-implemented method of claim 8 wherein determining weightings of risk comprises determining weightings using $$\text{Minimize } \lambda W^T H W - G^T W$$

$$\text{Subject } \sum_{i=1}^{N} W_i = 1$$

$Upper_{stock} \geq Stock\% \geq Lower_{stock}$ $Upper_{bonds} \geq Bonds\% \geq Lower_{bonds}$ $Upper_{cash} \geq Cash\% \geq Lower_{cash}$ $Upper_{foreign} \geq Foreign\% \geq Lower_{foreign}$ where W = weight matrix of fund tracking−
$errorwrtteinvestmentbenchmark$ $G = p$ − value of funds $\lambda$ = risk aversion ratio and $p$ − value = $t$ − distribution ($studentt$, $n - p - 1$)

$$\text{student } t = \frac{\alpha}{\sigma(\epsilon_t)/\sqrt{n-p}} = \text{information ratio} \times \sqrt{n-p}$$

Information ratio = $\alpha/\sigma(\epsilon_t)$ where $\alpha$ = average risk adjusted excess return during the period;

$\sigma(\epsilon_t)$ = tracking − error wrt the custom benchmark;

$n$ = number of observations;

$p$ = number of the independent random variables;

$n - p - 1$ = degrees of freedom in $t$ − test.

10. The computer-implemented method of claim 1 wherein selecting further comprises selecting based on investment net assets.

11. The computer-implemented method of claim 1 wherein selecting further comprises selecting based on a categorization of an investment.

12. The computer-implemented method of claim 11 wherein the categorization includes an investment objective.

13. The computer-implemented method of claim 11 wherein selecting further comprises selecting based on a style-category of an investment.

14. The computer-implemented method of claim 1 wherein selecting comprises selecting based on an $R^2$ descriptive statistic indicating the consistency of an investment's risk-adjusted excess return measure.

15. The computer-implemented method of claim 1 further comprising evaluating the constructed portfolio to verify that the constructed portfolio includes a specified level of fund diversification.

16. The computer-implemented method of claim 15 wherein evaluating the constructed portfolio further comprises determining whether sector allocation of the constructed portfolio matches a sector allocation of a market benchmark.

17. The computer-implemented method of claim 15 wherein evaluating the constructed portfolio comprises determining whether one of the selected investments in the constructed portfolio causes the constructed portfolio to exceed the target allocation range for a particular type of investment asset.

18. The computer-implemented method of claim 15 wherein evaluating the constructed portfolio comprises determining whether the portfolio includes a target allocation range for a particular type of asset.

19. The computer-implemented method of claim 15 further comprising constructing a second portfolio.

20. The computer-implemented method of claim 19 wherein constructing a second portfolio comprises constructing a different portfolio after modifying the one or more target allocation ranges.

21. The computer-implemented method of claim 1 further comprising generating a report describing the constructed portfolio.

22. The computer-implemented method of claim 1 further comprising receiving a target allocation range for company stock.

23. The computer-implemented method of claim 22 further comprising:
receiving data that allocates part of the portfolio to a company's stock; and
adjusting the received target allocation range for company stock based on the received portfolio allocation to company stock.

24. The computer-implemented method of claim 23 further comprising:
adjusting the one or more target allocation ranges for different types of investment assets such that the target allocation ranges and the allocation to company stock have an associated risk level substantially the same as a risk level associated with a portfolio not having an allocation to company stock.

25. A computer-implemented method of constructing a portfolio, the method comprising:
receiving target allocations of percentages of different types of assets, the types of assets comprising domestic stock funds, foreign stock funds, bonds, and fixed income assets;
receiving a list of investments available for inclusion in the portfolio;
screening by one or more computers the list of investments;
causing one or more computers to select and weight investments from the screened list of investments based on a measure of the risk-adjusted excess return of selected investments and the received target allocations, the measure of risk-adjusted excess return comprising an alpha measurement determined in accordance with:

$$R_t = \alpha + \beta_1 R_{1t} + \beta_2 R_{2t} + \ldots + \beta_N R_{nt} + \epsilon_t,$$

where
$\alpha$ = the risk adjusted excess return (alpha);
$R_t$ = the excess return of a fund in month t;
$R_{kt}$ = the excess return of factor k in month t (K=1 ... N);
$\beta_k$ = the $\beta$ of factor k (k=1 ... N);
$\epsilon_t$ = the tracking error in month t;
the weightings determined using Minimize $\lambda W^T H W - G^T W$ Subject $\sum_{i=1}^{N} W_i = 1$ $Upper_{stock} \geq Stock\% \geq Lower_{stock}$ $Upper_{bonds} \geq Bonds\% \geq Lower_{bonds}$ $Upper_{cash} \geq Cash\% \geq Lower_{cash}$ $Upper_{foreign} \geq Foreign\% \geq Lower_{foreign}$ where $W$ = weight matrix of fund tracking− errorwrtteinvestmentbenchmark $G = p -$ value of funds $\lambda$ = risk aversion ratio and $p -$ value = $t -$ distribution ($studentt$, $n - p - 1$)

-continued $$\text{student } t = \frac{\alpha}{\sigma(\varepsilon_t)/\sqrt{n-p}} = \text{information ratio} \times \sqrt{n-p}$$

Information ratio = $\alpha / \sigma(\varepsilon_t)$ where $\alpha$ = average risk adjusted excess return during the period;

$\sigma(\varepsilon_t)$ = tracking − error $wrt$ the custom benchmark;

$n$ = number of observations;

$p$ = number of the independent random variables;

$n - p - 1$ = degrees of freedom in $t -$ test.

26. A computer program product, disposed on a computer readable storage medium, for constructing a portfolio of investment assets that are held for a customer in a customer account, the computer program product including instructions for causing a processor to:
retrieve one or more target allocation ranges, each target allocation range including an upper limit value and a lower limit value for a type of investment asset to include in the portfolio;
receive a list of investment assets available for inclusion in the portfolio;
select investment assets from the list of investment assets based on a measure of the risk-adjusted excess return of selected investment assets and the retrieved target allocation ranges;
add the selected investment assets to the portfolio of investment assets;
determine an asset allocation value for a first type of investment asset in the portfolio;
compare the asset allocation value for the first type of investment asset to an upper limit value and a lower limit value of the target allocation range for the first type of investment asset; and
determine based on the comparison that the asset allocation value for the first type of investment asset is outside the target allocation range for the first type of investment asset.

27. The computer program product of claim 26 wherein the types of investment assets comprise fixed income assets.

28. The computer program product of claim 26 wherein the one or more target allocation ranges are associated with one or more categories of financial risk.

29. The computer program product of claim 26 wherein instructions to determine an asset allocation value for a first type of investment asset in the portfolio further comprises instructions to:
verify that the asset allocation value for the first type of investment asset in the portfolio substantially matches a target allocation value included in the target allocation range for the first type of investment asset.

30. The computer program product of claim 26 wherein the measure of risk-adjusted excess return comprises an alpha measurement determined in accordance with:

$$R_t = \alpha + \beta_1 R_{1t} + \beta_2 R_{2t} + \ldots + \beta_N R_{nt} + \epsilon_t,$$

where
$\alpha$ = the risk adjusted excess return (alpha);
$R_t$ = the excess return of a fund in month t;
$R_{kt}$ = the excess return of factor k in month t (K=1 ... N);
$\beta_k$ = the $\beta$ of factor k (k=1 ... N);
$\epsilon_t$ = the tracking error in month t.

31. The computer program product of claim 26 further comprising instructions for causing the processor to determine weightings of risk for the selected investments.

32. The computer program product of claim 31 wherein the instructions to determine weightings of risk comprises instructions for determining weightings using Minimize $\lambda W^T HW - G^T W$ Subject $\sum_{i=1}^{N} W_i = 1$ $Upper_{stock} \geq Stock\% \geq Lower_{stock}$ $Upper_{bonds} \geq Bonds\% \geq Lower_{bonds}$ $Upper_{cash} \geq Cash\% \geq Lower_{cash}$ $Upper_{foreign} \geq Foreign\% \geq Lower_{foreign}$ where $W$ = weight matrix of fund tracking−

$errorwrtteinvestmentbenchmark$ $G = p$ − value of funds $\lambda$ = risk aversion ratio and $p$ − value = $t$ − distribution ($student_t$, $n - p - 1$)

student $t = \dfrac{\alpha}{\sigma(\varepsilon_t)/\sqrt{n} - p}$ = information ratio $x \sqrt{n} - p$ Information ratio = $\alpha / \sigma(\varepsilon_t)$ where $\alpha$ = average risk adjusted excess return during the period;

$\sigma(\varepsilon_t)$ = tracking − error wrt the custom benchmark;

$n$ = number of observations;

$p$ = number of the independent random variables;

$n - p - 1$ = degrees of freedom in $t$ − test.

33. The computer program product of claim 26 wherein the instructions for causing a processor to select investment assets further comprise instructions to select investment assets based on investment net assets.

34. The computer program product of claim 26 wherein the instructions for causing a processor to select investment assets further comprise instructions to select investment assets based on a categorization of an investment.

35. The computer program product of claim 26 wherein the instructions for causing a processor to select investment assets further comprise instructions to select investment assets based on an $R^2$ descriptive statistic indicating the consistency of an investment's risk-adjusted excess return measure.

36. The computer program product of claim 26 further comprising instructions for evaluating the constructed portfolio to verify that the constructed portfolio includes a specified level of fund diversification.

37. The computer program product of claim 36 wherein the instructions for evaluating the constructed portfolio comprise instructions for determining whether sector allocation of the constructed portfolio follows a sector allocation of a market benchmark.

38. The computer program product of claim 26 further comprising instructions for modifying the one or more target allocation ranges.

39. The computer program product of claim 26 further comprising instructions for receiving a target allocation range for company stock.

40. The computer program product of claim 39 further comprising instructions for:
receiving data that allocates part of the portfolio to a company's stock; and
adjusting the received target allocation range for company stock based on the received portfolio allocation to company stock.

41. The computer program product of claim 40 further comprising instructions to:
adjust the one or more target allocation ranges for different types of investment assets such that the target allocation ranges and the allocation to company stock have an associated risk level substantially the same as a risk level associated with a portfolio not having an allocation to company stock.

* * * * *

UNITED STATES PATENT AND TRADEMARK OFFICE
CERTIFICATE OF CORRECTION

PATENT NO.         : 7,870,051 B1
APPLICATION NO.    : 09/346195
DATED              : January 11, 2011
INVENTOR(S)        : Xuehai En et al.

It is certified that error appears in the above-identified patent and that said Letters Patent is hereby corrected as shown below:

Col. 9, line 65, claim 9, delete "errorwrtteinvestmentbenchmark" and insert --errorwrttheinvestmentbenchmark--, therefor.

Col. 11, line 54, claim 25, delete "errorwrtteinvestmentbenchmark" and insert --errorwrttheinvestmentbenchmark--, therefor.

Col. 13, line 22, claim 32, delete "errorwrtteinvestmentbenchmark" and insert --errorwrttheinvestmentbenchmark--, therefor.

Signed and Sealed this
Fifth Day of April, 2011

David J. Kappos
*Director of the United States Patent and Trademark Office*